US007501718B2

(12) United States Patent
Baglin et al.

(10) Patent No.: US 7,501,718 B2
(45) Date of Patent: Mar. 10, 2009

(54) VOLTAGE SUPPLY CIRCUIT AND METHOD FOR GENERATING A SUPPLY VOLTAGE

(75) Inventors: Thomas Jean Ludovic Baglin, Rueil (FR); Albert Missoni, Graz (AT); Gerhard Nebel, Immenstadt (DE)

(73) Assignee: Infineon Technologies AG (DE)

( * ) Notice: Subject to any disclaimer, the term of this patent is extended or adjusted under 35 U.S.C. 154(b) by 87 days.

(21) Appl. No.: 11/181,032

(22) Filed: Jul. 12, 2005

(65) Prior Publication Data

US 2006/0001321 A1 Jan. 5, 2006

Related U.S. Application Data

(63) Continuation of application No. PCT/EP2004/000173, filed on Jan. 13, 2004.

(30) Foreign Application Priority Data

Jan. 14, 2003 (EP) ................................ 03000815

(51) Int. Cl.
*H02J 1/10* (2006.01)

(52) U.S. Cl. ........................................................ 307/43

(58) Field of Classification Search .................... 307/43
See application file for complete search history.

(56) References Cited

U.S. PATENT DOCUMENTS

| | | | | |
|---|---|---|---|---|
| 4,868,417 | A * | 9/1989 | Jandu | 327/65 |
| 5,402,375 | A * | 3/1995 | Horiguchi et al. | 365/189.09 |
| 6,194,953 | B1 | 2/2001 | Mueller et al. | |
| 6,404,076 | B1 * | 6/2002 | Matsuda et al. | 307/80 |
| 6,456,086 | B1 | 9/2002 | Bolz et al. | |
| 7,019,719 | B2 * | 3/2006 | LeChevalier | 345/82 |

* cited by examiner

*Primary Examiner*—Stephen W Jackson
*Assistant Examiner*—Adi Amrany
(74) *Attorney, Agent, or Firm*—Dickstein, Shapiro, LLP.

(57) ABSTRACT

A voltage supply circuit has a first supply voltage input connected to a first comparator and to a first voltage regulator, the first comparator controlling the first voltage regulator. A second supply voltage input is connected to a second comparator and to a second voltage regulator, the second comparator controlling the second voltage regulator. A supply voltage output is connected to the outputs of the two voltage regulators and is fed back to the two comparators.

23 Claims, 2 Drawing Sheets

VOLTAGE SUPPLY CIRCUIT AND METHOD FOR GENERATING A SUPPLY VOLTAGE

CROSS-REFERENCE TO RELATED APPLICATION

This application is a continuation of International Patent Application Serial No. PCT/EP2004/000173, filed Jan. 13, 2004, which published in German on Jul. 29, 2004 as WO 2004/064232, and is incorporated herein by reference in its entirety.

FIELD OF THE INVENTION

The invention relates to a voltage supply circuit and to a method for generating a supply voltage. Both the circuit and the method can be used, for example, to supply voltage for an integrated circuit.

BACKGROUND OF THE INVENTION

Generating a supply voltage entails a number of problems when two voltage sources are available. Managing two voltage sources for generating a supply voltage is more complex and more difficult than generating a supply voltage when only one voltage source is available.

The prior art discloses an embodiment for a circuit for generating a voltage supply, as is illustrated in FIG. 1. In the circuit shown, a choice is made between two external voltage sources and the output voltage VDD is formed using the external supply voltage chosen. To this end, the circuit has a first supply voltage input IN1, to which a first external supply voltage VDDEXT1 is applied, and a second supply voltage input IN2, to which a second external supply voltage VDDEXT2 is applied. The two external supply voltages VDDEXT1 and VDDEXT2 are fed to a respective comparator input of a comparator CMP. At the same time, the two external supply voltages VDDEXT1 and VDDEXT2 are also applied to the inputs of two voltage regulators REG1 and REG2. The two voltage regulators REG1 and REG2 are controlled using an external voltage VDDEXT3 which is applied to a voltage input IN3 of the circuit. At the operating voltage connection BA of the comparator CMP, the external voltage VDDEXT3 simultaneously forms the operating voltage for the comparator CMP and also the operating voltage for an inverter INV that is connected downstream of the latter. The output voltage ENREG1 generated by the comparator CMP is used as an additional control voltage for the first voltage regulator REG1 and, at the same time, as an input voltage for the inverter INV which uses it to form an inverted output voltage ENREG22. This inverted output voltage ENREG22 is used as an additional control voltage for the second voltage regulator REG2. The two outputs of the voltage regulators REG1 and REG2 are connected to one another and form the supply voltage output O of the voltage supply circuit.

In order to ensure that a reverse current does not arise in a system having two supply voltages, it is ensured, in the circuit shown in FIG. 1, that only one of the two voltage sources, and thus only one of the two external supply voltages VDDEXT1 or VDDEXT2, is activated. The other voltage source is deactivated. The voltage source which provides the higher supply voltage is generally chosen. This is because, in the case of the latter voltage source, there is a greater likelihood of the supply voltage provided being greater than the nominal supply voltage VDDnom and thus allowing correct regulation. The comparator CMP decides which of the two external voltage sources provides the higher supply voltage. The comparator CMP therefore compares the first external supply voltage VDDEXT1 with the second external supply voltage VDDEXT2. The higher of the two external supply voltages VDDEXT1 and VDDEXT2 is used to supply the downstream analog components. In this case, the following situations may arise.

1. The first external supply voltage VDDEXT1 is greater than the second external supply voltage VDDEXT2:

In this case, the voltage ENREG1 at the comparator output assumes the value of the external voltage VDDEXT3. In contrast, the inverted voltage ENREG22 at the output of the inverter INV assumes the value zero. The first voltage regulator REG1 regulates the supply voltage VDD to the value of the nominal supply voltage VDDnom. In contrast, the second voltage regulator REG2 isolates the second external supply voltage VDDEXT2 from the supply voltage output O because the voltage ENREG22 is 0.

2. The first external supply voltage VDDEXT1 is less than the second external supply voltage VDDEXT2:

In this case, the voltage ENREG1 at the output of the comparator CMP assumes the value zero. The inverted output voltage ENREG2 at the output of the inverter INV is then equal to the external voltage VDDEXT3. The second regulator REG2 regulates the output voltage VDD to the value of the nominal voltage VDDnom. The first voltage regulator isolates the first external supply voltage VDDEXT1 from the supply voltage output O because the voltage ENREG2 is 0.

However, the voltage supply circuit shown in FIG. 1 has a number of disadvantages. If the two external supply voltages VDDEXT1 and VDDEXT2 are greater than the nominal voltage VDDnom, both could be used to regulate the supply voltage VDD. However, only the voltage which is the higher of the two voltages is used. A solution of this type is not optimal in a system in which, although a voltage supply has a high voltage, it cannot provide a high current. That is to say, in the case of such a solution, it is possible to use the voltage source which, although it provides the higher voltage, provides the lower current. Voltage sources which provide a high supply voltage but only a low current may be, for example, magnetic or electric fields. If both voltage sources each provide a supply voltage which is greater than the nominal voltage VDDnom and the voltage source which provides the higher voltage is switched off, the voltage regulator associated with this voltage is also switched off and the other voltage regulator is switched on. In this case, it is difficult to generate a stable supply voltage VDD while changing over between the voltage regulators REG1 and REG2. If the two supply voltage sources provide supply voltages which are of equal magnitude, the two voltage regulators are alternatively switched on and off, which can result in the entire regulating system no longer operating correctly.

As shown in FIG. 2, the prior art discloses another embodiment for supplying voltage. In this embodiment, the first external supply voltage VDDEXT1 is fed to the first input of a comparator CMP1 via the first supply voltage input IN1 and a voltage converter 1. The second external supply voltage VDDEXT2 is routed to the first input of a second comparator CMP2 via the second supply voltage input IN2 and a second voltage converter 2. The second inputs of the first comparator CMP1 and of the second comparator CMP2 are connected to the output of a reference voltage source 3, with the result that a reference voltage VREF is applied to them. As in the case of the embodiment shown in FIG. 1 as well, in the embodiment shown in FIG. 2, the external voltage VDDEXT3 which is applied to the voltage input IN3 is used to control the two voltage regulators REG1 and REG2 and as an operating voltage for the two comparators CMP1 and CMP2. In addition, the external voltage VDDEXT3 is applied to the input of the voltage source 3 which generates the reference voltage VREF.

In the embodiment shown in FIG. 2, the first external supply voltage VDDEXT1 and the second external supply voltage VDDEXT2 are compared with the reference voltage VREF in order to avoid a reverse current. It shall be assumed, for further consideration, that the two voltage converters 1 and 2 multiply the external supply voltages VDDEXT1 and VDDEXT2 by a factor k. It is also assumed that the reference voltage VREF*k is greater than the nominal voltage VDDnom. The following states may occur during operation.

1. The voltage VDDEXT1 is greater than the reference voltage VREF*k and the voltage VDDEXT2 is likewise greater than the reference voltage VREF*k:

In this case, the two voltage regulators REG1 and REG2 regulate the supply voltage VDD to the value of the nominal voltage VDDnom. A reverse current cannot arise in this case since the voltage VDDEXT1 is greater than the reference voltage VREF*k, the latter is, in turn, greater than the nominal voltage VDDnom and the latter is, in turn, greater than or equal to the supply voltage VDD, and, in addition, the voltage VDDEXT2 is greater than the reference voltage VREF*k, the latter is, in turn, greater than the nominal voltage VDDnom and the latter is, in turn, greater than or equal to the supply voltage VDD.

2. The voltage VDDEXT1 is less than the reference voltage VREF*k and the voltage VDDEXT2 is greater than the reference voltage VREF*k:

In this case, the second voltage regulator REG2 regulates the supply voltage VDD to the value of the nominal voltage VDDnom. In contrast, the first voltage regulator REG1 is switched off.

3. The voltage VDDEXT1 is less than the reference voltage VREF*k and the voltage VDDEXT2 is less than the reference voltage VREF*k:

In this case, the two voltage regulators REG1 and REG2 are switched off. The supply voltage VDD is floating.

4. The voltage VDDEXT1 is less than the reference voltage VREF*k and the voltage VDDEXT2 is greater than the reference voltage VREF*k:

In this case, the first voltage regulator REG1 regulates the supply voltage VDD to the value of the nominal voltage VDDnom. In contrast, the second voltage regulator REG2 is switched off.

In contrast to the embodiment shown in FIG. 1, most of the disadvantages are avoided in the embodiment of the voltage supply circuit shown in FIG. 2. However, the embodiment shown in FIG. 2 still has the following disadvantages.

The two voltage regulators REG1 and REG2, the two voltage converters 1 and 2 and the reference voltage source 3 must be matched exactly to one another so that the value k*VREF is greater than the nominal voltage VDDnom. If this is not the case, for example if k*VREF is less than the first external supply voltage VDDEXT1, and the nominal voltage VDDnom is, in turn, less than the second external supply voltage VDDEXT2, both voltage regulators REG1 and REG2 are activated on account of this incorrect matching and a reverse current flows from the second external voltage source, via the second supply voltage input IN2, to the supply voltage output O and from there back to the first external voltage source at the first supply voltage input IN1.

It is frequently the case that the two voltage regulators REG1 and REG2 can be changed over between various nominal voltages VDDnom1, VDDnom2, VDDnom3 etc. In this case, it is necessary for the two voltage converters 1 and 2 to be able to change over between various multiplication factors k1, k2, k3 etc. In this case, it is all the more difficult to exactly match the two voltage regulators REG1 and REG2, the two voltage converters 1 and 2 and the reference voltage source 3 to one another in the manner already described, to be precise for each pair (VDDnom1, k1), (VDDnom2, k2), (VDDnom3, k3). This results in the circuit requiring more chip area, the power consumption increasing and the complexity of the circuit increasing.

SUMMARY OF THE INVENTION

The inventive voltage supply circuit has a first supply voltage input which is connected to a first comparator and to a first voltage regulator, the first comparator controlling the first voltage regulator. In addition, the circuit has a second supply voltage input which is connected to a second comparator and to a second voltage regulator, the second comparator controlling the second voltage regulator. Finally, the circuit has a supply voltage output which is connected to outputs of the two voltage regulators and is fed back to the two comparators.

In the inventive method for generating a supply voltage, a first supply voltage is applied to a first comparator and to a first voltage regulator, the first voltage regulator being controlled using the first comparator. A second supply voltage is applied to a second comparator and to a second voltage regulator, the second voltage regulator being controlled using the second comparator. The supply voltage is applied to a supply voltage output which is connected to the outputs of the two voltage regulators and is fed back to the two comparators.

BRIEF DESCRIPTION OF THE DRAWINGS

The invention will be explained in more detail below with reference to four figures.

DETAILED DESCRIPTION OF PREFERRED EMBODIMENTS OF THE INVENTION

Figure 1:
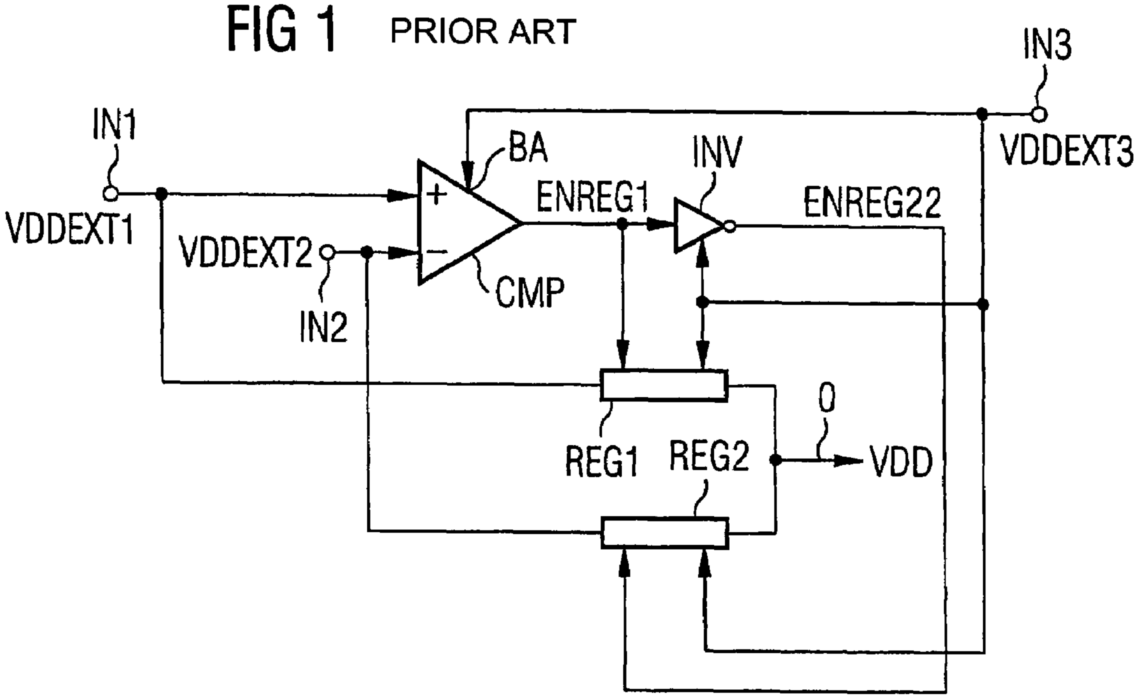
FIG 1 PRIOR ART
FIG. 1 shows a first embodiment of a voltage supply circuit in accordance with the prior art.

One object of the invention is to specify a voltage supply circuit and a method for generating a supply voltage in which a reverse current does not arise. The current is to flow from one current source to the supply voltage output of the circuit and not from one current source, via the supply voltage output of the circuit, back to the other current source.

In addition, the criteria for connecting and disconnecting the current paths are to be selected in such a manner that it is possible to regulate the supply voltage correctly when there are a number of different configurations.

The inventive voltage supply circuit and the method for generating a supply voltage can advantageously be used to avoid the disadvantages mentioned in the prior art.

The inventive voltage supply circuit has a first supply voltage input which is connected to a first comparator and to a first voltage regulator, the first comparator controlling the first voltage regulator. In addition, the circuit has a second supply voltage input which is connected to a second comparator and to a second voltage regulator, the second comparator controlling the second voltage regulator. Finally, the circuit has a supply voltage output which is connected to outputs of the two voltage regulators and is fed back to the two comparators.

In the inventive method for generating a supply voltage, a first supply voltage is applied to a first comparator and to a first voltage regulator, the first voltage regulator being controlled using the first comparator. A second supply voltage is applied to a second comparator and to a second voltage regulator, the second voltage regulator being controlled using the second comparator. The supply voltage is applied to a supply voltage output which is connected to the outputs of the two voltage regulators and is fed back to the two comparators.

In one embodiment of the inventive voltage supply circuit, a first voltage converter which is connected between the first supply voltage input and the first comparator is provided. In addition, a second voltage converter which is connected between the second supply voltage input and the second comparator is provided. This makes it possible for the two external supply voltages which are applied to the first and second supply voltage inputs to be multiplied by a particular value or reduced by a particular voltage value.

In accordance with one preferred embodiment variant of the inventive circuit, a third voltage converter which is connected between the supply voltage output and the first comparator is provided. In addition, a fourth voltage converter which is connected between the supply voltage output and the second comparator is provided. This makes it possible for the supply voltage which is applied to the supply voltage output to be multiplied by a particular value or reduced by a particular voltage value.

In one development of the inventive voltage supply circuit, the voltage converters are designed in such a manner that the voltage which can be applied to their inputs can be converted into a voltage which is proportional to that voltage using a defined proportionality factor.

In addition, in the inventive circuit, the voltage converters may be designed in such a manner that the voltage which can be applied to their inputs can be converted into a voltage that has been reduced by a particular value.

In order to achieve the object, it is also proposed to provide a voltage input which is connected to operating connections of the comparators and to the control inputs of the voltage regulators. This makes it possible, inter alia, to prescribe the operating voltage for the comparators.

Finally, in the inventive circuit, the first voltage regulator may have a first N-channel MOS transistor and the second voltage regulator may have a second N-channel MOS transistor. In this case, the control outputs of the two transistors are fed back to the control inputs of the two transistors.

Figure 3:
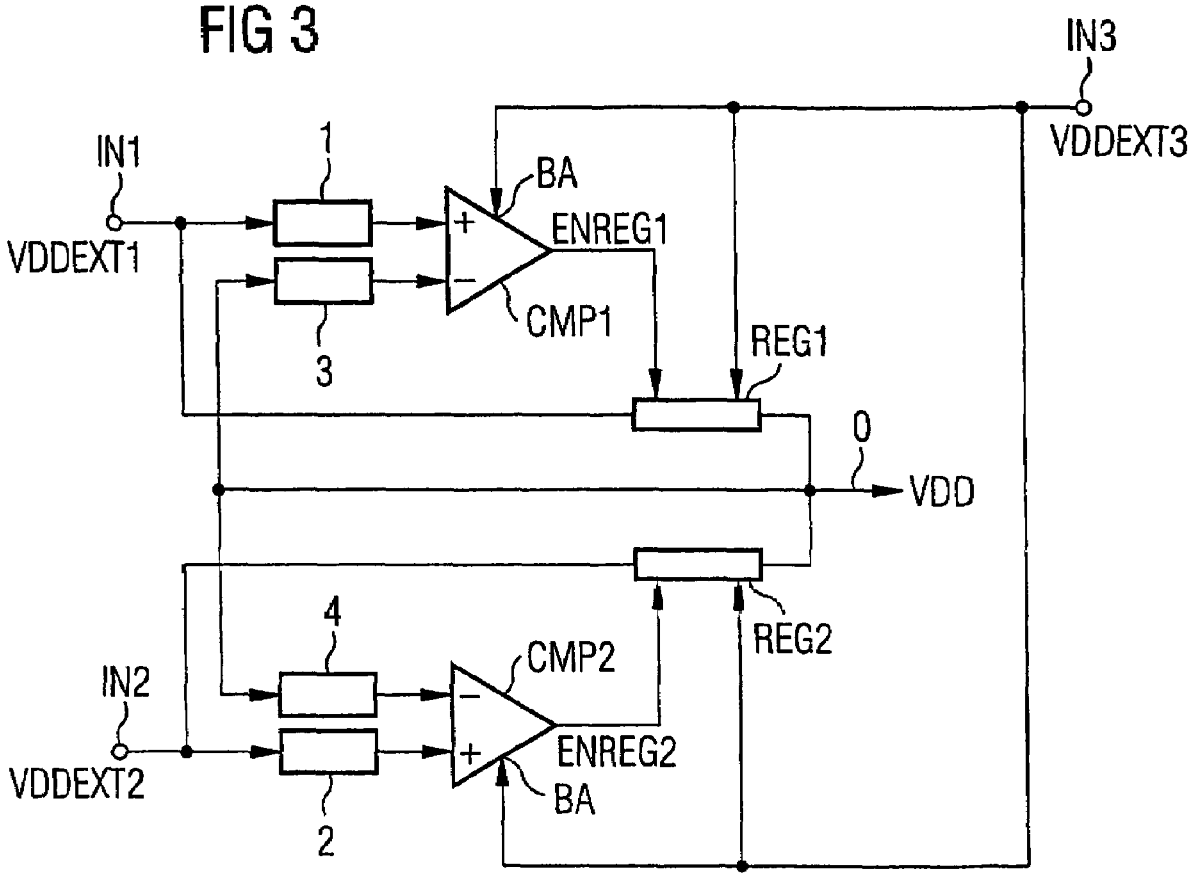
FIG. 3 shows a possible embodiment of the inventive voltage supply circuit.

FIG. 3 illustrates the inventive circuit for generating a supply voltage, a first supply voltage input IN1, which can be connected to a first voltage source (not shown) for generating a first external supply voltage VDDEXT1, is provided. The first external supply voltage VDDEXT1 which is applied to the first supply voltage input IN1 is fed to a first input of a first comparator CMP1 via a first voltage converter 1. In addition, the first external supply voltage VDDEXT1 is applied to the input of a voltage regulator REG1. The circuit has a second supply voltage input IN2 which can be connected to a second voltage source (not shown) for generating a second external supply voltage VDDEXT2. The second external supply voltage VDDEXT2 is applied to a first input of a second comparator CMP2 via a second voltage converter 2 and to an input of a second voltage regulator REG2. The first voltage regulator REG1 is controlled using the signal which is applied to the output of the first comparator CMP1 and has the control voltage ENREG1 and an external voltage VDDEXT3 which is applied to a third input IN3. The same applies correspondingly to the second voltage regulator REG2. The latter is controlled using the output voltage ENREG2 of the second comparator CMP2 and the external voltage VDDEXT3. The outputs of the two voltage regulators REG1 and REG2 are connected to one another and lead, on the one hand, to the supply voltage output O of the circuit and, on the other hand, to the inputs of a third and a fourth voltage converter 3 and 4, which third and fourth voltage converters are, in turn, connected to the second inputs of the first and second comparators CMP1 and CMP2, respectively. During operation, the desired supply voltage VDD can be tapped off at the output O of the circuit.

The method of operation of the inventive voltage supply circuit will be described below. In the inventive solution, the internally generated supply voltage VDD is compared with the two external supply voltages VDDEXT1 and VDDEXT2 rather than comparing two supply voltages with one another or comparing two supply voltages with a reference voltage.

In order to facilitate understanding, it is assumed, for the following embodiments, that the voltage converter 1 multiplies the first external supply voltage VDDEXT1 by the multiplier k and the voltage converter 3 has been bridged using a simple line. The same applies to the second external supply voltage VDDEXT2 and the voltage converter 4.

The following states may occur during operation.

1. The value k*VDDEXT1 is less than the nominal voltage VDDnom and the value k*VDDEXT2 is greater than the nominal voltage VDD:

In this case, the supply voltage VDD is equal to zero during the switch-on operation. The value k*VDDEXT1 is therefore greater than the supply voltage VDD and the value k*VDDEXT2 is also greater than the supply voltage VDD. The control voltage ENREG1 at the output of the comparator CMP1 then assumes the value of the voltage VDDEXT3 and the control voltage ENREG2 at the output of the second comparator CMP2 likewise assumes the value of the external voltage VDDEXT3, with the result that the voltage regulators REG1 and REG2 regulate. The supply voltage VDD therefore now increases until it reaches and exceeds the value k*VDDEXT1. The first comparator CMP1 then changes over and adjusts the control voltage ENREG1 to the value zero. As a result, the voltage regulator REG1 is switched off. The supply voltage output O is now isolated from the first external supply voltage VDDEXT1, which is advantageous since the first external supply voltage VDDEXT1 is less than the supply voltage VDD. A current would otherwise flow from the supply voltage input IN2 to the supply voltage input IN1. The supply voltage VDD increases further until it reaches the value of the nominal voltage VDDnom and is regulated to this value. The control voltage ENREG2 at the output of the second comparator CMP2 remains at the value of the external voltage VDDEXT3 because the value k*VDDEXT2 is greater than the nominal supply voltage VDDnom.

2. The value k*VDDEXT1 is greater than the nominal voltage VDDnom and the value k*VDDEXT2 is greater than the nominal voltage VDDnom:

In this case, the supply voltage VDD is equal to zero during the switch-on operation, with the result that the value k*VDDEXT1 is greater than the supply voltage VDD and the value k*VDDEXT2 is also greater than the supply voltage VDD. The control voltage ENREG1 at the output of the first comparator CMP1 therefore assumes the value of the external voltage VDDEXT3 and the control voltage ENREG2 at the output of the second comparator CMP2 likewise assumes the value of the external voltage VDDEXT3. The two voltage regulators REG1 and REG2 are now operating. The supply voltage VDD now increases until it reaches the desired nominal voltage value VDDnom without one of the two voltage regulators REG1 and REG2 being switched off because the value k*VDDEXT1 is greater than the nominal voltage VDDnom and the value k*VDDEXT2 is simultaneously also greater than the nominal voltage value VDDnom. The two voltage regulators REG1 and REG2 therefore remain active the entire time.

3. The value k*VDDEXT1 is less than the nominal voltage VDDnom, the value k*VDDEXT2 is less than the nominal voltage VDDnom and the first external supply voltage VDDEXT1 is less than the second external supply voltage VDDEXT2:

In this case, the supply voltage VDD is equal to zero during the switch-on operation, with the result that the value k*VDDEXT1 is greater than the supply voltage VDD and the value k*VDDEXT2 is simultaneously also greater than the supply voltage VDD. The comparator CMP1 therefore adjusts the control voltage ENREG1 to the value of the external voltage VDDEXT3 and the second comparator CMP2 likewise adjusts the control voltage ENREG2 to the value of the external voltage VDDEXT2. The two voltage regulators REG1 and REG2 are now operating and ensure that the supply voltage VDD increases until the value k*VDDEXT1 is reached and exceeded. The first comparator CMP1 now brings the control voltage ENREG1 to the value zero so that the first voltage regulator REG1 is switched off. The supply voltage VDD continues to increase until it reaches the value k*VDDEXT2. The supply voltage VDD does not increase further since the second comparator CMP2 now puts the control voltage ENREG2 to the value zero and thus switches off the second voltage regulator REG2.

If necessary, the circuit shown in FIG. 3 can be modified to the effect that, when the two control voltages ENREG1 and ENREG2 assume the value zero, with the result that the two voltage regulators REG1 and REG2 are switched off, the supply voltage output O is connected to the higher of the two supply voltages VDDEXT1 and VDDEXT2, respectively. This makes it possible to increase the number of operating states in which the regulator system operates correctly.

4.a) The value k*VDDEXT2 is less than the nominal voltage VDDnom and the value k*VDDEXT1 is greater than the nominal voltage VDDnom;

4.b) The value k*VDDEXT2 is greater than the nominal voltage VDDnom and the value k*VDDEXT1 is greater than the nominal voltage VDDnom;

4.c) The value k*VDDEXT2 is less than the nominal voltage VDDnom, the value k*VDDEXT1 is less than the nominal voltage VDDnom and the second external supply voltage VDDEXT2 is less than the first external supply voltage VDDEXT1;

If the circuit is of symmetrical design, in state 4.a): k*VDDEXT2 less than VDDnom and k*VDDEXT1 greater than VDDnom, the behavior of the circuit can be derived from the operating state 1: k*VDDEXT1 less than VDDnom and k*VDDEXT2 greater than VDDnom by interchanging the two suffixes 1 and 2 of the two external supply voltages VDDEXT1 and VDDEXT2.

The same applies to the operating states 4.b): k*VDDEXT2 greater than VDDnom and k*VDDEXT1 greater than VDDnom and 4.c): k*VDDEXT2 less than VDDnom, k*VDDEXT1 less than VDDnom and VDDEXT2 less than VDDEXT1.

Figure 2:
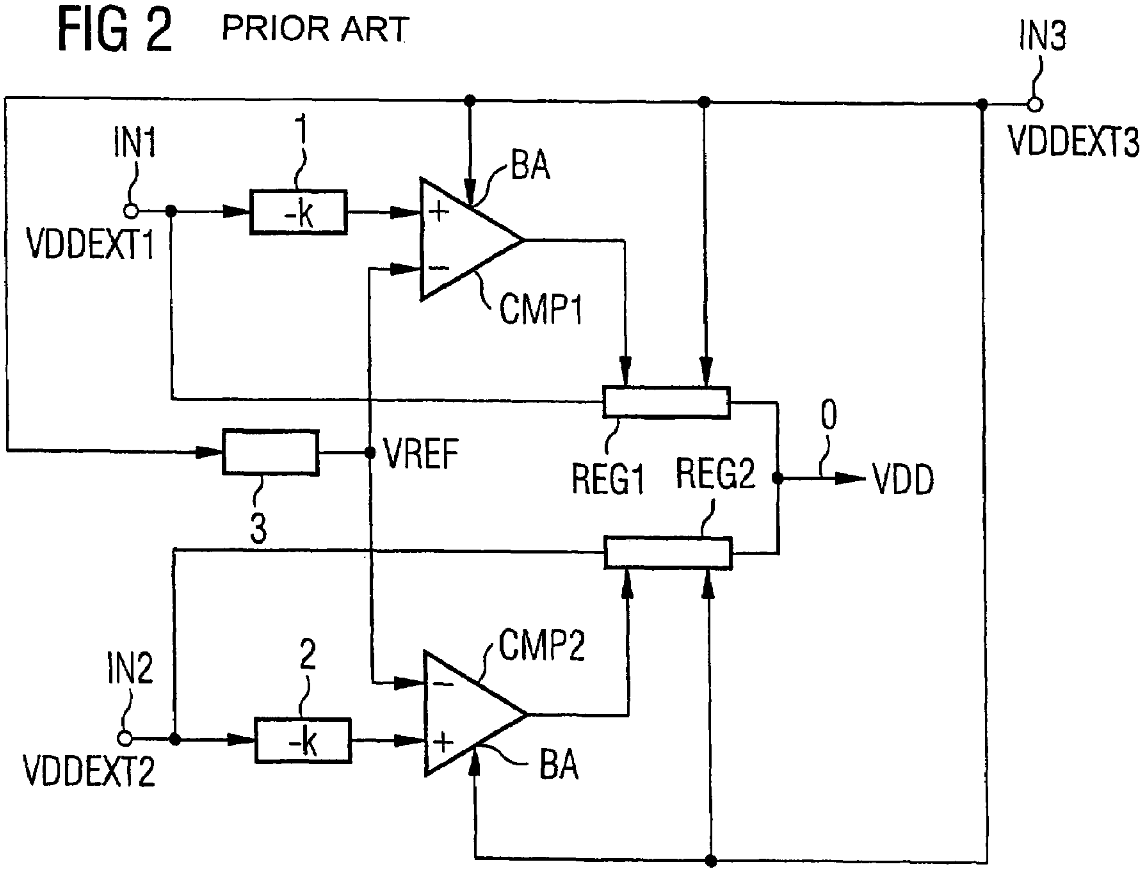
FIG 2 PRIOR ART
FIG. 2 shows a second embodiment of a voltage supply circuit in accordance with the prior art.

The disadvantages associated with the embodiments shown in FIGS. 1 and 2 are avoided using the inventive solution. If the supply voltages VDDEXT1 and VDDEXT2 originating from the two voltage sources are higher than the nominal voltage VDDnom, both voltage sources can thus be used to regulate the supply voltage VDD.

If both supply voltages VDDEXT1 and VDDEXT2 are greater than the nominal supply voltage VDDnom/k and one of the two voltage sources is switched off, it is easier to keep the supply voltage VDD stable than in the prior art because one of the two voltage regulators REG1 and REG2, respectively, remains in operation.

It is possible to change over between the two voltage sources in an oscillating manner only if the second external supply voltage VDDEXT2 is equal to the nominal voltage VDDnom or if the first external supply voltage VDDEXT1 is equal to the nominal voltage VDDnom. However, since this is a relatively rare situation, this state will scarcely occur.

In addition, it is advantageous that it is not necessary to match the two voltage regulators REG1 and REG2 and the voltage converters 1 to 4.

If the voltage regulators REG1 and REG2 have to change over between various nominal voltages VDDnom1, VDDnom2, VDDnom3 etc., nothing needs to be modified in the inventive voltage supply circuit.

Figure 4:
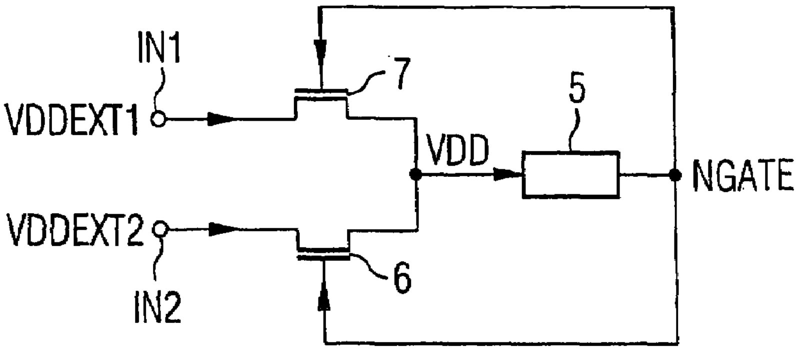
FIG. 4 shows the basic design of a voltage regulator as can be used in the inventive voltage supply circuit.

FIG. 4 shows one possible embodiment for a voltage regulator. As shown, two NMOS transistors 6 and 7 can be used to regulate the voltage. The size of the two NMOS transistors 6 and 7 should be the same and the gate connections of the two NMOS transistors 6 and 7 should be connected to one another. In the saturated operating state, the drain-source current IDS for an NMOS transistor results from the following equation:

$$IDS=k*W/L*(VGS-VTH)*2*(1+LAMBDA*VDS/L)$$

where:

K is a technology constant,
LAMBDA/L is the Early voltage,
IDS is the drain-source current,
VDS is the drain-source voltage,
VGS is the gate-source voltage,
VTH is the threshold voltage,
W is the width of the transistor, and
L is the length of the transistor.

The saturated operating state is present when the voltage VDS is greater than the voltage difference VGS−VTH.

The two transistors 6 and 7 have the same gate-source voltage VGS=NGATE−VDD, that is to say the current which is provided by the two transistors in the saturated operating state is approximately the same and, to be precise, is independent of the external supply voltages VDDEXT1 and VDDEXT2. In this case, NGATE is the voltage at the output of the regulator loop 5. This is the case, in particular, if the Early effect of the NMOS transistors is minimized by making the length of the transistors long. If one voltage source is switched off, the corresponding gate is isolated from the output of the regulator loop 5 using a circuit (not shown). The supply voltage VDD falls by $(\sqrt{2}-1)*(VGS-VTH)$, with the result that the voltage falls more slowly as the width of the NMOS transistor increases.

When using a regulator of this type in the circuit shown in FIG. 3, it is possible to achieve continuous operation of the chip even if one of the two external voltage sources is switched off.

In principle, the two voltage regulators REG1 and REG2 operate in the same manner. The method of operation of the first voltage regulator REG1 will therefore be described below as representative of the two. If the control voltage ENREG1 is equal to zero, the resistance in the voltage regulator REG1 between its input, which is connected to the first supply voltage input IN1, and its output, which is connected to the supply output O, becomes infinitely large. If the control voltage ENREG1 assumes the value of the external voltage VDDEXT3 and if the supply voltage VDD is greater than the nominal voltage VDDnom, the resistance in the voltage regulator between its input and output increases until the supply voltage VDD is equal to the nominal voltage VDDnom. The resistance can increase to infinity. If the control voltage ENREG1 is equal to the value of the external voltage VDDEXT3 and if the supply voltage VDD is less than the nominal voltage VDDnom, the resistance between the input and the output of the voltage regulator REG1 decreases until the supply voltage VDD is equal to the nominal voltage VDDnom. If appropriate, the resistance falls to the value zero. The nominal voltage VDDnom is a constant voltage.

In principle, the voltage converter generates, at its output, either a voltage which has been reduced by a constant voltage in comparison with the input voltage or a voltage which is the product of a constant multiplier k or proportionality factor and the input voltage. In this case, the constant multiplier k is between the values zero and one.

The comparator generates, at its output, a voltage which is equal to the operating voltage that is applied to its operating voltage input if the voltage applied to the noninverting input of the comparator is greater than the voltage applied to the inverting input of the latter. Otherwise, it generates, at its output, a voltage having the value zero.

What is claimed is:

1. A voltage supply circuit, comprising: a first supply voltage input which is connected to a first comparator and connected directly to a first voltage regulator, the first comparator controlling the first voltage regulator; a second supply voltage input which is connected to a second comparator and connected directly to a second voltage regulator, the second comparator controlling the second voltage regulator; and a supply voltage output which is connected to outputs of the two voltage regulators and is fed back to the two comparators.

2. The circuit as claimed in claim 1, further comprising: a first voltage converter which is connected between the first supply voltage input and the first comparator; and a second voltage converter which is connected between the second supply voltage input and the second comparator.

3. The circuit as claimed in claim 2, further comprising: a third voltage converter which is connected between the supply voltage output and the first comparator; and a fourth voltage converter which is connected between the supply voltage output and the second comparator.

4. The circuit as claimed in claim 3, wherein at least one of the voltage converters converts a voltage applied to its input into a voltage which is proportional to the applied voltage using a proportionality factor.

5. The circuit as claimed in claim 3, wherein at least one of the voltage converters converts a voltage applied to its input into a voltage that has been reduced by a particular value.

6. The circuit as claimed in claim 1, further comprising a voltage input which is connected to operating connections of the comparators and control inputs of the voltage regulators.

7. The circuit as claimed in claim 1, wherein the first voltage regulator has a first N-channel MOS transistor, the second voltage regulator has a second N-channel MOS transistor, and control outputs of the two transistors are fed back to control inputs of the two transistors.

8. A method for generating a supply voltage, comprising the steps of: applying a first supply voltage to a first comparator and connected directly to a first voltage regulator, the first voltage regulator being controlled using the first comparator; applying a second supply voltage to a second comparator and connected directly to a second voltage regulator, the second voltage regulator being controlled using the second comparator; and applying the supply voltage to a supply voltage output which is connected to outputs of the two voltage regulators and is fed back to the two comparators.

9. The method as claimed in claim 8, further comprising the step of converting the first supply voltage into a voltage which is proportional to the first supply voltage using a proportionality factor.

10. The method as claimed in claim 8, further comprising the step of converting the second supply voltage into a voltage which is proportional to the second supply voltage using a proportionality factor.

11. The method as claimed in claim 8, further comprising the step of converting the supply voltage into a voltage which is proportional to the supply voltage using a proportionality factor.

12. The method as claimed in claim 8, further comprising the step of converting the first supply voltage into a voltage that has been reduced by a particular value.

13. The method as claimed in claim 8, further comprising the step of converting the second supply voltage into a voltage that has been reduced by a particular value.

14. The method as claimed in claim 8, further comprising the step of converting the supply voltage into a voltage that has been reduced by a particular value.

15. The method as claimed in claim 8, further comprising the step of applying a third supply voltage to operating connections of the comparators and control inputs of the voltage regulators.

16. The method as claimed in claim 8, wherein the first voltage regulator has a first N-channel MOS transistor, the second voltage regulator has a second N-channel MOS transistor, and the method further comprises the step of feeding back control outputs of the two transistors to control inputs of the two transistors.

17. A voltage supply circuit, comprising: a first supply voltage input which is connected to a first comparing means and connected directly to a first voltage regulating means, the first comparing means controlling the first voltage regulating means; a second supply voltage input which is connected to a second comparing means and connected directly to a second voltage regulating means, the second comparing means controlling the second voltage regulating means; and a supply voltage output which is connected to outputs of the two voltage regulating means and is fed back to the two comparing means.

18. The circuit as claimed in claim 17, further comprising: a first voltage converting means which is connected between the first supply voltage input and the first comparing means; and a second voltage converting means which is connected between the second supply voltage input and the second comparing means.

19. The circuit as claimed in claim 18, further comprising: a third voltage converting means which is connected between the supply voltage output and the first comparing means; and a fourth voltage converting means which is connected between the supply voltage output and the second comparing means.

20. The circuit as claimed in claim 19, wherein at least one of the voltage converting means converts a voltage applied to its input into a voltage which is proportional to the applied voltage using a proportionality factor.

21. The circuit as claimed in claim 19, wherein at least one of the voltage converting means converts a voltage applied to its input into a voltage that has been reduced by a particular value.

22. The circuit as claimed in claim 17, further comprising a voltage input which is connected to operating connections of the comparing means and control inputs of the voltage regulating means.

23. The circuit as claimed in claim 17, wherein the first voltage regulating means has a first N-channel MOS transistor, the second voltage regulating means has a second N-channel MOS transistor, and the control outputs of the two transistors are fed back to the control inputs of the two transistors.

* * * * *